United States Patent Office 3,406,467
Patented Oct. 22, 1968

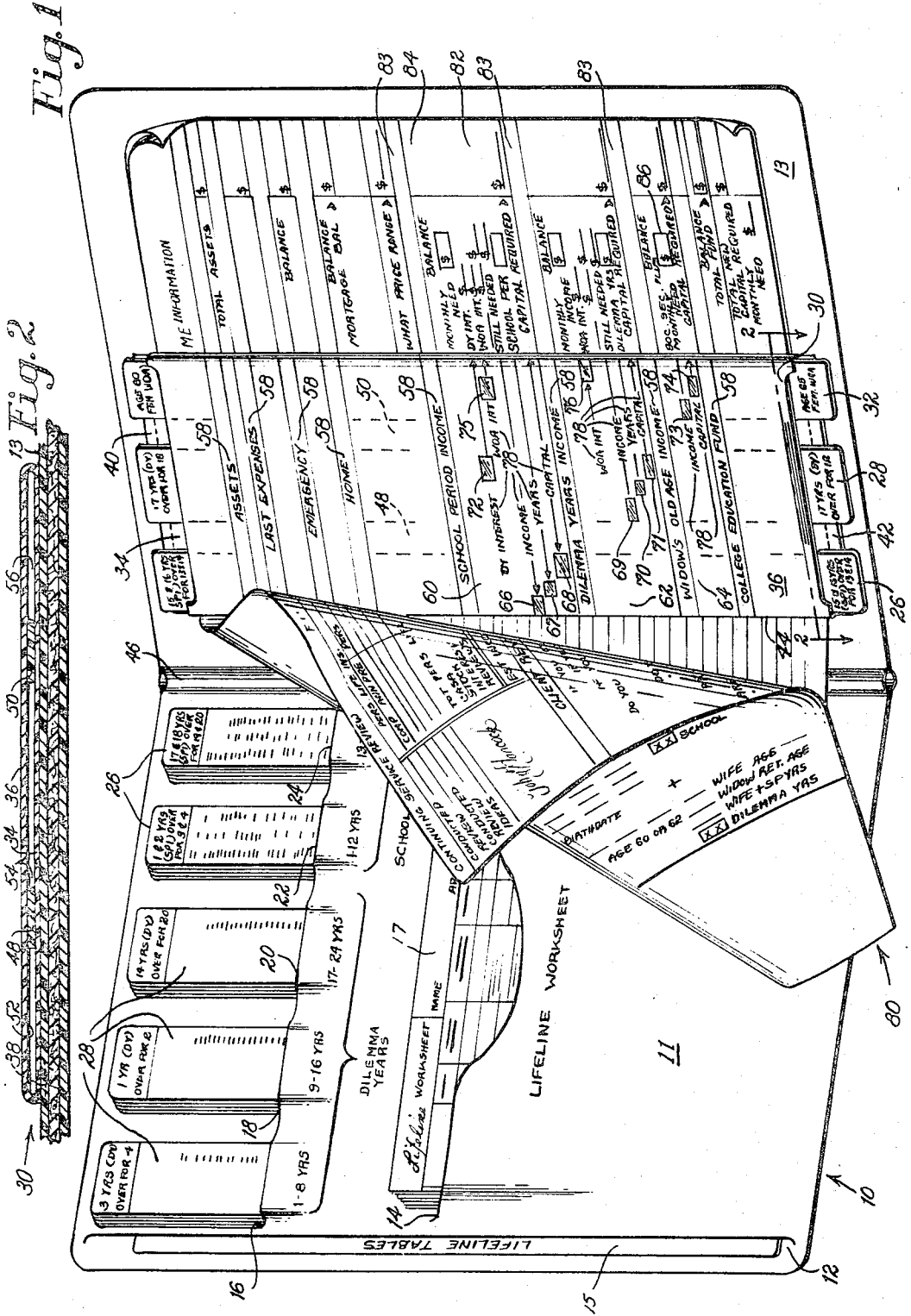

3,406,467
INSURANCE EVALUATION
Samuel Lufkin Davis, Acton, Mass., assignor to John Hancock Mutual Life Insurance Company, Boston, Mass., a corporation of Massachusetts
Filed June 30, 1966, Ser. No. 561,865
5 Claims. (Cl. 35—24)

ABSTRACT OF THE DISCLOSURE

Device for calculating and displaying information relating to insurance comprising indicia bearing slides movable in a display member attached at two places to a backing and having indicators arranged to cooperate with the slide indicia, and a page for data recordation arranged to slide between the display member and the backing.

This invention relates to calculation and display of information relating to insurance.

A primary object of the invention is to provide a device for calculation and display of several variable financial factors, which is simple and inexpensive to manufacture, and can be easily and reliably used in the determination of insurance needs.

In general the invention features a plurality of slides bearing indicia and a display member having a plurality of display portions corresponding respectively to the slides. Each display portion has at least one indicator and at least one display portion has a plurality of indicators. Slide locators are arranged to locate the slides in indicating relationship with selected ones of the indicators and to locate at least one slide in indicating relationship simultaneously with indicators of a plurality of the display portions. The last mentioned slide has indicia corresponding to, and arranged for location in simultaneous indicating relationship with indicators of, each of the last mentioned plurality of display portions. In preferred embodiments there are three slides and three display portions; a first slide has indicia corresponding to and arranged for location in simultaneous indiciating relationship with indicators of all three display portions, and a second slide has indicia corresponding to and arranged for location in simultaneous indicating relationship with indicators of two display portions; the display member has a generally opaque wall bearing legends defining the display portions; the indicators are transparent windows in the wall; the display member is a sleeve with spacers arranged to locate elongated slides side by side; at least one display portion has a plurality of slides corresponding thereto for use in different financial situations; and a page for data recordation is removably retained (preferably it slides between the display member and a backing) adjacent the display member with data recordation blanks arranged adjacent the respective display portions.

Other objects, features, and advantages will appear from the following description of a preferred embodiment of the invention, taken together with the attached drawings thereof, in which:

FIG. 1 is an isometric view of the device of the invention; and

FIG. 2 is a section at 2—2 of FIG. 1.

A folder (of vinyl covered cardboard), indicated generally at 10, provides in its left hand portion 11 storage pockets 12 and 14 for carrying numerical tables 15 and worksheets 17 used in the calculation of life insurance needs. Five additional storage pockets 16, 18, 20, 22, 24, together carry two sets of slides 26, 28. Each slide carries seevral columns of numbers relating to the variable financial factors to be employed in the calculation.

The right hand portion 13 of folder 10 carries a plastic sleeve 30 for receiving, side by side, a selected slide 26, a selected slide 28, and a third slide 32 permanently kept in sleeve 30. Sleeve 30 consists of a single piece of plastic folded to form a lower wall 34, an upper wall 36, and a flap extension 38 of wall 36 connected to the left underside of wall 34. Wall 36 is cut away at its ends to expose wall 34, the ends 40 and 42 of which are cemented to folder portion 13, with the left hand edge 44 of sleeve 30 spaced about an inch from the centerline 46 of folder 10. Plastic spacer strips 48 and 50 are cemented between walls 34 and 36 to define slide locator channels 52, 54, and 56 in sleeve 30, each of a width slightly greater than that of the respective slides 26, 28 and 32.

Various legends 58 appear on sleeve wall 36, as can be seen in FIG. 1. In particular, the legends SCHOOL PERIOD INCOME, DILEMMA YEARS INCOME, and WIDOW'S OLD AGE INCOME serve as headings for the play portions 60, 62 and 64, each of which consists of the full sleeve width area between its respective heading and the next legend 58, and each of which relates to a particular financial period in the life of a family contemplating the purchase of life insurance. Display portions 60, 62 and 64 correspond respectively, in terms of the financial periods to which they relate, to slides 26, 28 and 32.

Sleeve wall 36 is opaque except at eleven transparent oblong indicator windows 66–76 which are arranged so that three windows 66–68 communicate with channel 52 at display portion 60; four windows 69–72 communicate with channel 54, one at display portion 60 and three at display portion 62; and four windows 73–76 communicate with channel 56, one at display portion 60, one at display portion 62, and two at display portion 64. Each window 66–76 is spaced both laterally and longitudinally from each of the other ten windows and is identified by an appropriate legend 78.

Paper information folder 80 provides for recordation of financial data. Page 82 of folder 80, in particular, is designed to cooperate with the slides and sleeve just described, and can be inserted under sleeve 30 as shown in FIG. 1. The left hand portion of page 82, covered by sleeve 30 in FIG.1, bears legends identical to and aligned with legends 58, as well as certain subheadings under those legends with blanks to be filled in prior to insertion of page 82 under sleeve 30. The right hand portion of page 82, shown in FIG. 1, contains various legends and blanks for recordation of data in part calculated with the slides and sleeve. Colored bands 83 are provided for alignment with legends 58.

Slides 26, 28 and 32 bear numbers in three, four and five columns respectively, arranged so that as each slide is adjusted in its channel in sleeve 30 numerals will simultaneously appear in all of the windows communicating with that slide.

The use of the device described above is based upon the financial objective of providing income security, through life insurance, for each of the three chronological periods corresponding to display portions 60, 62 and 64. Thus, after recording in folder 80 data reflecting, for the family in question, present assets, and projected outlay for last expenses, emergency, and home mortgage or rent, and entering this data in the blanks provided at the right of page 82 to produce a net available capital balance at 84, the monthly income (after social security) required during the widow's old age period is estimated and entered at box 86. Slide 32, which bears indicia corresponding to the old age period, is adjusted in channel 56 until the monthly need figure appears in window 73, at which time the capital required to meet this need will appear in window 74. Simultaneously, figures will appear in windows 75 and 76 representing the usable income that the capital indicated in window 74 will produce during the years corresponding to display portions 60 and 62. The data on one side of slide 32 corresponding to a widow's old age period beginning at age sixty, and the data on the other side to a period beginning at age sixty-two, with markings appearing at the top and bottoms of the slide so that the side in use may be easily identified while in sleeve 30. On each side the four columns of numbers are arranged longitudinally and laterally for respective simultaneous apperance, from left to right, in windows 73, 74 75 and 76.

In a similar manner, the monthly income requirement during the period lasting from the time children leave school until the old age period is estimated and entered on page 82 (taking into account the already available income indicated in window 76), and slide 28 is adjusted until the required income appears in window 69 and the number of years in this school age to old age period appears in window 70. The required additional capital then appears in window 71. Simultaneously, a figure will appear in window 72 representing the usable income that the capital indicated in window 71 will produce during the years corresponding to display portion 60. Twelve slides 28 are provided, with each side of each slide bearing data corresponding to a school age to old age period of a particular number of years, these slides thus covering possible periods from one to twenty-four years long. On each side the number of years in the period covered is marked at top and bottom, and the four columns of numbers are arranged for respective simultaneous appearance, from left to right, in windows 69, 70, 71 and 72.

Finally, the monthly income requirement during the period lasting from the time of the insurance evaluation up to the time the youngest child in the family leaves school (at age 18 or 22) is estimated and entered on page 82 (taking into account social security during that period as well as the figures in windows 72 and 75), and slide 26 is adjusted until the required income appears in window 66 and the number of years in the school age period appears in window 67. The required additional capital then appears in window 70. Six slides 26 are provided, each slide bearing on both sides data corresponding to school age periods of two particular numbers of years, these slides thus covering possible school periods from one to twenty-two years long. On each side the number of years in the periods covered are marked at top and bottom, the three columns of numbers corresponding to one period are arranged on the upper half of the slide for simultaneous appearance in windows 66, 67 and 68, and the three columns of numbers corresponding to the second period are similarly arranged on the lower half of the slide.

Appropriate entries are made in the blanks and boxes provided at the right hand portion of page 82, as the slide manipulations described above are carried out. Finally, the several capital requirements derived are compared to the asset balance at 84 and insurance requirements are computed in the usual manner.

Other embodiments will occur to those skilled in the art and are within the following claims.

What is claimed is:

1. A device for calculating and displaying information relating to insurance, comprising:
  a multiplicity of elongated slides each bearing a plurality of laterally spaced columns of numbers, said numbers on a first set of said slides relating to a widow's old age period, said numbers on a second set of said slides relating to a dilemma years period, said numbers on a third set of said slides relating to a school period,
  a display sleeve providing first, second and third side by side longitudinally extending channels for slides of said first, second and third sets respectively, said sleeve having on its top wall three longitudinally spaced display portions relating respectively to said school, dilemma years and widow's old age periods,
  said widow's old age period display portion having capital and income indicating windows communicating with said first channel,
  said dilemma years period display portion having a widow's old age interest indicating window communicating with said first channel, and capital and income indicating windows communicating with said second channel,
  said school period display portion having a widow's old age interest indicating window communicating with said first channel, a dilemma years interest indicating window communicating with said second channel, and capital and income indicating windows communicating with said third channel,
  said numbers on slides of said first set being arranged for simultaneous appearance of a net widow's old age period income requirement in said income indicating window of said widow's old age period display portion, a corresponding capital amount for producing said income requirement in said capital indicating window of said widow's old age period display portion, interest during said dilemma years period attributable to said widow's old age capital in said widow's old age interest indicating window of said dilemma years display portion, and interest during said school period attributable to said widow's old age capital in said widow's old age interest indicating window of said school period display portion,
  said numbers on slides of said second set being arranged for simultaneous appearance of a net dilemma years income requirement in said income indicating window of said dilemma years period display portion, a corresponding capital amount for producing said income requirement in said capital indicating window of said dilemma years period display portion, and interest during said school period attributable to said dilemma years capital in said dilemma years interest indicating window of said school period display portion,
  and said numbers on slides of said third set being arranged for simultaneous appearance of a net school period income requirement in said income indicating window of said school period display portion, and a corresponding capital amount for producing said income requirement in said income indicating window of said school period display portion.

2. The device of claim 1 wherein said sleeve is mounted in a backing folder, at least one of said sets includes a plurality of slides corresponding to different lengths of the said period to which said set relates, and said folder has storage pockets for those of said slides not in use.

3. The device of claim 1 wherein said sleeve is mounted on a backing surface and a data recordation page is provided to slide between said sleeve and said surface, said page having a portion extending beyond the edge of said sleeve so that data may be recorded on said portion in conjunction with said appearances of said numbers in said indicating windows, said page having marked spaces for development and recordation of a present net asset balance, for recordation of said numbers appearing in said windows and development and recordation of said net income requirements, and for comparison of the total of said corresponding capital requirements to said net asset balance.

4. A device for calculating and displaying information relating to insurance, comprising:
  a plurality of slides bearing indicia, and
  a display member having:
    a plurality of display portions corresponding respectively to said slides, each said portion having at least one indicator, at least one said portion having a plurality of indicators,
    a plurality of slide locators arranged to locate said slides in indicating relationship with selected ones of said indicators and to locate at least one of said slides in said indicating relationship simultaneously with indicators of a plurality of said display portions, said one slide having indicia corresponding to, and arranged for location in said simultaneous indicating relationship with indicators of, each of said last mentioned plurality of display portions, a backing to which said display member is attached at two spaced areas, and a page for data recordation sized to slide between said backing and said display member between said spaced areas, said page having data recordation blanks arranged adjacent the respective display portions.

5. A device for calculating and displaying information relating to insurance, comprising:

three slides bearing indicia, and a display member having:

three display portions corresponding respectively to said slides, each said portion having at least one indicator, at least one said portion having a plurality of indicators, and a plurality of slide locators arranged to locate said slides in indicating relationship with selected ones of said indicators, a first of said slides having indicia corresponding to and arranged for loaction in simultaneous indicating relationship with indicators of each of said display portions;

a second of said slides having indicia corresponding to and arranged for location in simultaneous indicating relationship with indicators of two of said display portions;

said slides being of elongated rectangular form, each bearing a plurality of laterally spaced columns of numbers;

a backing folder providing in one inside portion thereof storage pockets for said slides when not in use;

said display member being a sleeve attached at its top and bottom to the other inside portion of said folder, with two spacers being arranged within said sleeve to locate said slides in side by side relationship in said sleeve;

said display portions being longitudinally spaced on the top wall of said sleeve and defined by legends relating to chronological financial periods of variable length;

at least two of said display portions having a plurality of slides corresponding thereto for use in connection with said financial periods of various lengths;

said top wall of said sleeve being generally opaque with the transparent windows defining said indicators arranged to communicate with said numbers in said columns successively as said slides are advanced in said sleeve;

and a recordation flolder, said folder being provided with one page sized to be inserted between said sleeve and said other folder potrion, said folder being creased to close inside said backing folder when the latter is closed with said page so inserted;

said page having legends and bands arranged for alignment with the legends on said display member wall, and recordation blanks arranged adjacent the respective display portions.

References Cited
UNITED STATES PATENTS

| | | | |
|---|---|---|---|
| 894,043 | 7/1908 | Oldroyd | 35—75 |
| 1,876,236 | 9/1932 | Jackson. | |
| 2,380,318 | 7/1945 | Kline. | |
| 2,925,668 | 2/1960 | Forest | 35—24 |

EUGENE R. CAPOZIO, *Primary Examiner.*

H. S. SKOGQUIST, *Assistant Examiner.*